United States Patent [19]

Harris et al.

[11] Patent Number: 4,859,413

[45] Date of Patent: Aug. 22, 1989

[54] COMPOSITIONALLY GRADED AMORPHOUS METAL ALLOYS AND PROCESS FOR THE SYNTHESIS OF SAME

[75] Inventors: Jonathan H. Harris, Shaker Heights; Michael A. Tenhover; Richard S. Henderson, both of Solon, all of Ohio

[73] Assignee: The Standard Oil Company, Cleveland, Ohio

[21] Appl. No.: 129,029

[22] Filed: Dec. 4, 1987

[51] Int. Cl.$^4$ .............................................. B22F 1/00
[52] U.S. Cl. ........................................ 419/32; 419/33; 419/46; 420/590
[58] Field of Search ...................... 419/32, 33, 46; 420/590

[56] References Cited

U.S. PATENT DOCUMENTS

| | | | |
|---|---|---|---|
| 3,737,300 | 6/1973 | Cairns et al. | 75/5 |
| 3,865,572 | 2/1975 | Fisher et al. | 419/30 |
| 4,557,893 | 12/1985 | Jatkar et al. | 419/12 |
| 4,564,396 | 1/1986 | Johnson et al. | 148/4 |
| 4,585,617 | 4/1986 | Tenhover et al. | 419/34 |
| 4,624,705 | 11/1986 | Jatkar et al. | 419/33 |
| 4,640,816 | 2/1987 | Atzmon et al. | 419/24 |
| 4,710,236 | 12/1987 | Schultz | 419/33 |
| 4,728,580 | 3/1988 | Grasselli et al. | 428/610 |

OTHER PUBLICATIONS

J. H. Schelleng et al., "Hydrogenation and Magnetic Properties of Amorphous Rate-Earth-Iron (R-Fe) Alloys", J. Appl. Phys. 55(6), Mar. 15, 1984.
P. S. Gilman et al., "Mechanical Alloying", Ann. Rev. Mater. Sci., 1983, 13:279-300.

Primary Examiner—Stephen J. Lechert, Jr.
Attorney, Agent, or Firm—Sue E. Phillips; Joseph G. Curatolo; Larry W. Evans

[57] ABSTRACT

The present invention is directed to a process for the synthesis of a compositionally graded substantially amorphous metal alloy comprising:
(a) combining a bulk hydrogen storage material with an A-containing material to obtain a mixture thereof;
(b) sealing the mixture in a mechanical milling device under an inert atmosphere; and
(c) milling the mixture.

Alloys produced by this process are useful for the efficient cyclic storage and release of hydrogen in large quantities without becoming embrittled, inactivated or corroded.

16 Claims, 1 Drawing Sheet

X-RAY PHOTOEMISSION DEPTH PROFILE

●-BALL MILLED AMORPHOUS $Ni_{61}Zr_{39}$
WITH 1 Wgt % Pd
($Ni_{60.5}Zr_{38.7}Pd_{0.8}$)

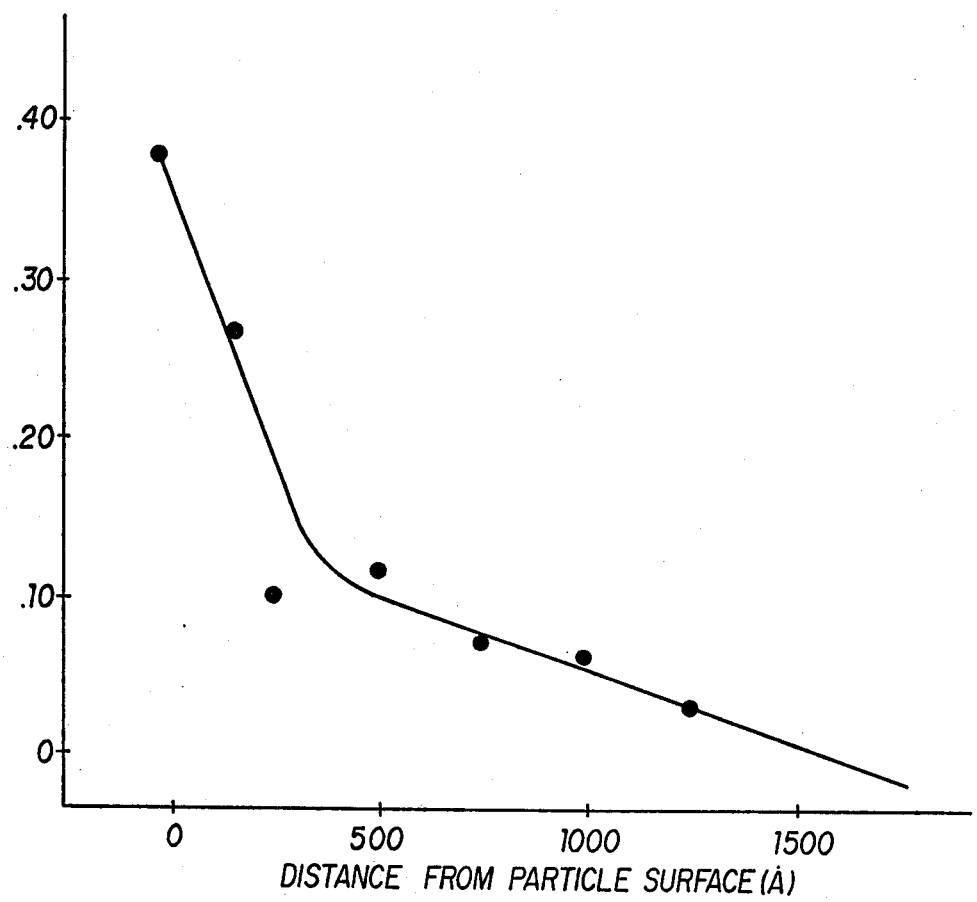

COMPOSITIONALLY GRADED AMORPHOUS METAL ALLOYS AND PROCESS FOR THE SYNTHESIS OF SAME

FIELD OF THE INVENTION

This invention relates to compositionally graded amorphous metal alloys and the novel preparation of such alloys by surface alloying. These alloy materials are useful for the efficient cyclic storage and release of hydrogen in large quantities without becoming embrittled, inactivated or corroded.

BACKGROUND OF THE INVENTION

Shortages of fossil fuel materials in the recent past have spurred much speculation regarding the feasibility of economies based on other energy sources. One such scenario is a hydrogen-fueled economy. Hydrogen has the highest energy density per unit weight of any chemical. Many projections have been made for an economy based on this element, but the technology is not yet in place to effect such a dramatic change in the world economy. Hydrogen is, however, a technically attractive source of fuel and energy storage. It is essentially non-polluting, the major by-product of combustion being $H_2O$, and can be made from readily available and abundant raw materials.

While it is well known that hydrogen can be stored as a compressed gas or cryogenically as a liquid, other less energy-intensive and more convenient means are required for widespread utilization of hydrogen as a source of stored energy. It is known that some metals and metal alloys are capable of storing hydrogen reversibly within their lattice. This characteristic may be exploited by exposing the metal or metal alloy to a large pressure of hydrogen, impregnating the metal or metal alloy with hydrogen and later recovering the stored hydrogen by subjecting the impregnated metal or alloy to a change in temperature or pressure.

Recently, amorphous metal alloy materials have been reported as having the ability to store hydrogen reversibly. Amorphous metal alloy materials have become of interest due to their unique combinations of mechanical, chemical and electrical properties. Amorphous metal materials have compositionally variable properties including high hardness and strength, flexibility, soft magnetic and ferroelectronic properties, very high resistance to corrosion and wear, unusual alloy compositions, and high resistance to radiation damage. The unique combinations of properties possessed by amorphous metal alloy materials may be attributed to the disordered atomic structure of amorphous materials that insures that the material is chemically homogeneous and free from the extended defects that are known to limit the performance of crystalline materials.

Novel amorphous metal compositions for reversible hydrogen storage are disclosed in U.S. Ser. No. 717,428, which disclosure is incorporated herein by reference. This disclosure teaches compositionally graded reversible hydrogen storage materials comprising amorphous metal alloys of the formula:

$$A_aM_bM'_c$$

wherein
A is at least one metal selected from the group consisting of Ag, Au, Hg, Pd and Pt;

M is at least one metal selected from the group consisting of Pb, Ru, Cu, Cr, Mo, Si, W, Ni, Al, Sn, Co, Fe, Zn, Cd, Ga and Mn; and M' is at least one metal selected from the group consisting of Ca, Mg, Ti, Y, Zr, Hf, Nb, V, Ta and the rare earths; and wherein
a ranges from greater than zero to about 0.80;
b ranges from zero to about 0.70; and
c ranges from about 0.08 to about 0.95.

These amorphous compositions are not affected by phase separation or hydrogen embrittlement. Further, the above amorphous compositions have the ability to store hydrogen without exhibiting any significant signs of surface passivation or corrosion after repeated charge/discharge cycles.

Known processes suitable for the production of amorphous alloy materials include solid state reaction methods. U.S. Pat. No. 4,564,396 discloses a process for the formation of metastable solid, amorphous materials by solid state reaction, by diffusion of a metallic component into a solid compound, or by diffusion of a gas into an intermetallic compound.

Another method of producing metastable amorphous or fine crystalline alloy materials is disclosed in U.S. Pat. No. 4,640,816, which recites the production of bulk alloy materials by reacting cold-worked, mechanically deformed filamentary precursors, such as metal powder mixtures or intercalated metal foils.

Similar mechanical alloying techniques are disclosed elsewhere in the literature primarily for the production of homogeneous mixtures or dispersions of metal-nonmetal components, such as in U.S. Pat. No. 3,737,300 disclosing wrought composite titaniferous and/or zirconiferous metal powders and U.S. Pat. No. 4,557,893 disclosing a process for producing composite materials by mechanical alloying.

However, while numerous methods and techniques are known for producing amorphous alloy materials, the field lacks a method by which compositionally graded alloys can be efficiently synthesized resulting in a substantial amount of one component being concentrated on the surface of a bulk material, while maintaining the desired characteristics of the resulting material. This area of technology also lacks a process which allows for control of processing parameters such that a compositionally graded structure can be achieved.

It is therefore, an object of this invention to provide a process by which compositionally graded amorphous metal alloys can be produced.

It is a further objection of this invention to provide a surface alloying process for the production of compositionally graded amorphous metal alloys having a substantial amount of one component on the surface of the bulk alloy component.

SUMMARY OF THE INVENTION

The present invention is directed to a process for the synthesis of a compositionally graded substantially amorphous metal alloy comprising:
(a) combining a bulk hydrogen storage material with an A-containing material to obtain a mixture thereof;
(b) sealing the mixture in a mechanical milling device under an inert atmosphere; and
(c) milling the mixture.

BRIEF DESCRIPTION OF THE DRAWING

FIG. 1 is a graph displaying the compositionally graded nature of the alloy produced according to the subject invention

DESCRIPTION OF THE INVENTION

In accordance with this invention, there is provided a novel surface alloying process for the formation of compositionally graded substantially amorphous metal alloys. These alloys are of the formula AMM', wherein the MM' portion of the alloy is a bulk hydrogen storage material, and the AMM' portion of the alloy is a hydrogen absorbing material. The term "compositionally graded", as used herein with reference to the formed amorphous metal alloys, means that a substantial portion of the A component is disposed on or near the surface of the alloy that will come in contact with hydrogen available for absorption into the alloy. Thus, the alloy structure is characterized by a spatially decreasing concentration of A from the surface of the alloy material to the bulk of the alloy material. The term, therefore, embodies any alloy material wherein the concentration gradient of A enhances the hydrogen absorption and/or desorption into and/or out of the alloy material. By "substantial" is meant at least fifty percent of the A component is disposed on or near the surface of the alloy composition. Preferably, at least seventy-five percent of the A-component is disposed on or near the surface of the amorphous composition, and most preferably about one hundred percent of the A component is disposed on or near the surface of the amorphous composition.

The amorphous metal alloys discussed herein are substantially amorphous. By "substantially amorphous" is meant that the amorphous metal alloys are at least fifty percent amorphous, as indicated by X-ray diffraction analysis. Preferably, the metal alloy is at least eighty percent amorphous, and most preferably about one hundred percent amorphous, as indicated by X-ray diffraction analysis.

Surface alloying refers to any physical process which intimately contacts starting materials with excess mechanical energy. More particularly, the invention contemplates milling which, as used herein, refers to the use of excess mechanical energy to cause intimate contact of the starting materials with one another, such that the starting materials are alloyed by the force of repeated physical collision, resulting in the formation of a compositionally graded alloy. In order to achieve this type of graded composition structure, milling variables must be adjusted; i.e. a specific set of milling variable must be employed to produce a given graded alloy composition, AMM'. Failure to properly control the appropriate milling variables may result in production of a homogeneous alloy structure, as opposed to a compositionally graded structure. Milling variables that may be adjusted include milling time, amount of excess energy employed, starting particle size, physical properties of the starting powder, and presence of milling additives. Examples of suitable milling techniques which afford the opportunity to control the critical variables include ball milling, jet milling, wet milling, grinding, cold rolling, pulverization, and shot peening.

The compositionally graded substantially amorphous metal alloy formed by the inventive process disclosed herein may be synthesized from a variety of starting materials, one of which functions as a bulk hydrogen storage material, MM', and the other an element, compound or alloy, A, which when milled with the MM' material forms a hydrogen absorbant component, AMM'. The bulk hydrogen storage material may be an amorphous polycrystalline, multi-phase polycrystalline, or crystalline alloy, or a combination thereof, and the A component of the hydrogen absorbant material may be derived from a crystalline element, crystalline alloy or amorphous alloy.

Hydrogen storage, especially electrochemical hydrogen storage, involves two phenomena; surface electrochemistry and bulk interstitial hydrogen storage. The active surface must effectively supply the bulk with atomic hydrogen during charging and provide sites for rapid discharge of hydrogen.

The role of the bulk material is to store as many hydrogen atoms as possible reversibly, so as to keep the surface supplied with atomic hydrogen. Though some pure metals with slightly negative heats of formation for the hydride, such as Pd or Ni, will store small amounts of hydrogen reversibly, significantly more hydrogen can be stored in a suitable metallic alloy. In general, alloying components are chosen such that a balance is reached between materials with positive and negative hydride heats of formation. In this way, hydrogen may sit in interstitial sites in the metallic alloy lattice. The balance of alloying components is important since this determines the depth of the potential well in which hydrogen is situated, and thus controls the kinetics of hydrogen diffusion from one interstitial site to the next.

A second consideration in choosing a bulk hydrogen storage alloy composition is that of mechanical stability. Many metallic alloys that store substantial amounts of hydrogen become tremendously embrittled as hydrogen is incorporated into their lattice.

Suitable bulk hydrogen storage materials preferably contain at least one metal, M, selected from the group consisting of Ni, Co, Fe, Cu, Mn, Pd, Ru, Si, Cr, Mo, W, Al, Sn, Zn, Cd, and Ga and at least one metal, M', selected from the group consisting of Ti, Zr, V, Nb, Ca, Mg, Y, Hf, Ta, and the rare earths. This material forms the bulk of the compositionally graded alloy material which results from the instant novel procedure.

The bulk hydrogen storage material, MM', may be prepared by any known alloying technique. Such techniques include rapid quenching, gas atomization, vacuum induction melting, arc melting, crucible melting and solid state reaction techniques. The starting materials useful in the subject invention may be produced by any appropriate known technique, and are preferably produced in the form of ribbons, crushed ingots or powders, though other forms may also be suited for use in the instant invention.

The A component of the resulting AMM' composition, is situated substantially on the surface of the compositionally graded alloy formed by the subject inventive process, and is at least one metal selected from the group consisting of Pd, Pt, Ir and Rh. This A component may be provided as a metal, such as Pt metal, or as an A-containing compound or alloy such as $Mg_{75}Pt_{10}Pd_{15}$, $Al_{12}Pd_2Pt_2$, $Mg_{82}Pdg$, $Al_3Pd$, $Al_{90}Pd_{10}$, $Zr_2Pd$, $Pt_{60}Zn_{40}$, $Ca_{80}Pd_5Al_{15}$ and $PdNiAl_6$. Preferable non-A components of A-containing compounds include Al, Zn, Mg, Ca, Ti, Zr and V.

To achieve a more completely and evenly blended dispersion, which in turn increases the likelihood of particle contact between the hydrogen storage material and the A-containing compound, it is preferable to use a compound having a low atomic density of A atoms. Further, the non-A component of an A-containing compound can be chosen such that several functions are attained. Exemplary thereof are enhancing hydrogen storage capacity, facilitating binding of the resulting alloy components, or increasing hydrogen absorption rate. The component may also be able to be dissolved out of the resulting alloy, thus leaving higher surface area. There may exist negligable amounts of impurities in the resultant alloy material due to the presence of other trace elements in the A-containing compound. These impurities, however, have little if any affect on the storage capabilities of the resulting alloy.

The initial mixture of bulk hydrogen storage material and A-containing material used in the milling process may be attained by any combination method known to those skilled in the art, including physical mixture of powders, electrodeposition of A-containing material onto the bulk hydrogen storage material, electroless deposition of A-containing material onto the bulk hydrogen storage material, chemical vapor deposition of A-containing material onto the bulk hydrogen storage material, and precipitation of A-containing compounds from both aqueous and non-aqueous solutions onto the bulk hydrogen storage material.

Surface alloying, which is the alloying technique claimed herein, provides an excellent means by which compositionally graded alloy materials may be produced. This type of alloying process allows control over alloying parameters, enabling the practitioner to control the profile of the compositionally graded alloy, the extent of alloying, and the resulting particle size.

The preferred embodiment of this invention contemplates vibratory ball milling. The particle size of the starting materials, that is the MM' bulk hydrogen storage material and the A-containing material, may be up to about 250$\mu$, and preferably ranges from about 75$\mu$ to about 250$\mu$. The weight ratio of the MM' bulk hydrogen storage material to the A material is up to about 1 wgt. % A, preferably about 0.1 wgt. % A.

Preferably, the balls employed in the vibratory ball milling are made of hardened steel. The ball to powder weight ratio in the milling process is between about 1 to 5 and about 5 to 1 preferably between about 1 to 1 and 1 to 2.

The milling process is preferably carried out under an inert atmosphere. Exemplary of such an atmosphere are nitrogen, argon, helium and hydrogen. The milling time may be up to about 6 hours, but preferably is less than about 5 hours, though the necessary time may be longer when using a less energetic milling process.

Milling additives may be useful when it is preferred that small particles be produced. Some additives that might be employed include organic solvents, such as heptane and pentane, inorganic materials, such as calcium stearate and titanium dioxide, and polymeric materials, such as teflon, among others.

The AMM' compositionally graded amorphous metal alloys produced by the process disclosed herein are useful for cyclic storage and release of hydrogen in large quantities. These alloys effectively resist corrosion caused by surface oxidation. they are superior candidates for use as electrodes and other hydrogen gas storage devices, as hydrogen-dueterium separation devices, in chemical heat pumps, in compressors, in thermal storage devices, and in air conditioners, to name a few applications.

SPECIFIC EXAMPLES

The following examples are presented to more thoroughly explain the instant invention, but are not intended to be limitative thereof. The examples demonstrate the surface milling of bulk hydrogen storage materials with A-containing materials to produce compositionally graded amorphous metal alloys useful for reversible hydrogen storage.

Example 1

Two grams of amorphous $Ni_{61}Zr_{39}$ ribbons, prepared by rapid quenching, were embrittled with hydrogen at 125° C. and crushed to yield a powder having particle sizes ranging from 75 to 150$\mu$. This powder was mixed with 1 wgt. % (0.02g) of polycrystalline Pd powder which was less than 250$\mu$ particle size. The combined powders were sealed under nitrogen in a steel ball mill jar (1.5" diameter by 2.25" depth) with two 1.0g steel balls. The powders were then vibratory ball milled in a Spex 8000 mixer mill for 30 minutes. The resultant powder was analyzed by X-Ray diffraction which indicated it was completely amorphous. X-Ray Photoemission depth profile measurements were performed with a Phi 5400 Spectrometer using a Mg anode and an AR-ion sputtering source.

FIG. 1 is an X-ray photoemission depth profile showing the Pd/Ni ratio of the alloy powder particles produce in this example measured as a function of distance from the particle surface. This figure clearly illustrates the desired compositional gradient, as the Pd/Ni ratio falls sharply the further away from the surface the measurement is taken.

A 50mg sample of this powder was mixed with 50mgs of Ni-binder and pressed into a pellet for electrochemical hydrogen storage capacity testing. The pellet was wrapped with Ni-screen and placed in an electrochemical test cell consisting of a Ni hydroxide counter electrode (having excess capacity compared to the hydrogen storage test pellet) in an electrolyte of 4N KOH. The sample was charged at 200 mA/g until the voltage in the cell reached 1.5 volts. The pellet had a stable discharge capacity of 185 mA-hr/g for the active material.

Example 2

One weight percent polycrystalline Pt powder (5$\mu$ particle size) was combined with amorphous $Ni_{60}Zr_{40}$ powder (less than 250$\mu$ particle size) which was formed by the hydrogen embrittlement procedure outlined above in Example 1. The combined powders were sealed under nitrogen in a steel ball mill jar and mixer milled (U.S. Stoneware Mixer Mill) for 48 hours using two 8g steel balls. Because the mechanical energy employed was less than that used in the other examples set forth herein, the milling time was increased in order to achieve the desired compositional gradient. The resulting alloy powder was then examined by X-Ray diffraction and evaluated for electrochemical hydrogen storage as in Example 1. The X-Ray spectra indicated that the resultant powder was completely amorphous, the sharp lines due to polycrystalline Pt having disappeared. At a discharge rate of 100 mA/g the capacity was 170 mA-hr/g.

Example 3

According to the procedure described in Example 1 above, 10 wgt. % polycrystalline Pd powder was added to amorphous hydrogenated $Ni_{35}Ti_{65}$ powder (less than 250μ particle size). This mixture was sealed in a steel ball mill jar under nitrogen and vibratory ball milled in a Spex mill for 1.5 hrs with two 8g steel balls.

X-Ray diffraction showed the resultant powder was completely amorphous. A sample of powder was etched for 0.5 hrs in 0.5% hydrofluoric acid and tested for electrochemical hydrogen storage. The powder had a capacity of 146 mA-hr/g at 100 mA/g discharge rate.

Example 4

According to the procedure set forth in Example 1 above, 1 wgt. % polycrystalline Pd powder (5μ particle size) was combined with amorphous $Ni_{63}Zr_{37}$ hydrogenated powder (less than 250μ particle size) sealed in a ball mill jar under nitrogen, and vibratory ball milled with two 8.0g steel balls for 0.5 hrs.

X-Ray diffraction indicated the resultant powder was completely amorphous. This powder had an electrochemical hydrogen storage capacity of 173 mA-hr/g at 100 mA/g discharge and 200 mA-hr/g at 20 mA/g discharge current.

Example 5

Polycrystalline $PdZr_2$ was pulverized to a coarse grain and milled under nitrogen in a Spex mill for 1 hr with two 8g steel balls. According to the procedure set forth in Example 1 above, 10 wgt. % of this powder was combined with amorphous $Ni_{60}Zr_{40}$ powder formed by Spex milling hydrogenated melt quenched ribbons for 10 minutes under nitrogen with two 8 g steel balls. The powder mixture was sealed in a ball mill jar under nitrogen, mix milled overnight and then vibratory milled in the Spex mill with two 1g steel balls for 2, 3, 4 and 6 hrs.

The 2, 3 and 4 hr samples all yielded electrochemical hydrogen storage capacity of about 170 mA-hr/g. The 6 hour sample had significantly lower capacity of 148 mA-hr/g, indicating the active Pd was becoming alloyed too deeply into the bulk of the material.

Example 6

Amorphous $Ni_{60}Zr_{40}$ powder was etched 0.5 hours in 0.5% hydrofluoric acid, rinsed in water, and then treated with a solution of Pd acetate dissolved in 10n KOH to yield a 1 wgt. % loading of Pd on the powder. This chemically treated powder was then loaded into a mill jar under nitrogen and vibratory milled for 2 hrs with two 1g steel balls. The electrochemical capacity was found to be 193 mA-hr/g at 100 mA/g and 208 mA-hr/g at 20 mA/g.

Example 7

Crystalline Zr metal was loaded into a ball mill jar in air, and milled for 0.5 hrs with two 8g balls in a Spex vibratory ball mill. The jar was then cleaned of excess Zr. This process reduced the possibility of contamination of the powder by impurities from the jar. A mixture of 1 wgt. % Pd powder (5μ particle size) and amorphous $Ni_{60}Zr_{40}$ powder (less than 250μ particle size) were added to this jar and sealed under nitrogen. This mixture was vibratory ball milled with the two 8g steel balls that were previously coated with Zr for 0.5 hrs. The resulting powder was then etched with 0.5% hydrofluoric acid for 0.5 hrs, which dissolved away any excess crystalline Zr. The resulting electrochemical hydrogen storage capacity was 213 mA-hr/g at 100 mA/g and 234 mA-hr/g at 20 mA/g.

Example 8

The vibratory ball mill jar of Example 1 was modified by glueing Pd foil on its top and bottom inner surface. Amorphous $Ni_{60}Zr_{40}$ powder was added to this jar along with Pd shot instead of steel balls, and sealed under nitrogen. The powder was milled for 1.0 hr in the Spex mill. After etching in 0.5% hydrofluoric acid for 0.5 hrs, the resulting powder had an electrochemical hydrogen storage capacity of 196 mA-hr/g at 100 mA/g and 215 mA-hr/g at 20 mA/g.

Example 9

The same procedure as in Example 8 above was followed, but without lining the mill jar with Pd foil. After 1.5 hrs milling with Pd shot, the electrochemical hydrogen storage capacity of the resulting powder was 200 mA-hr/g at 100 mA/g and 216 mA-hr/g at 20 mA/g.

Example 10

Five grams of amorphous $Ni_{61}Zr_{39}$ powder (less than 75μ particle size) was combined with 0.123 mmol of $Al_{12}Pd_4$ and sealed in a steel mill jar under nitrogen. The mixture was milled for 30 minutes with one 8g steel ball and two 1g steel balls. These samples were tested electrochemically by removing 150 mA-hr/g in 1.15 hrs repeatedly, and the end-of-cycle voltage was recorded. The sample was cycled in this manner 142 times before the voltage dropped below 0.0 volts.

Example 11

The same procedure as in Example 10 above was followed, except that $Al_{12}Pd_4$ was replaced by the nickel analog, $Al_{12}Ni_4$. When tested electrochemically in an identical manner, the voltage dropped below 0.0 volts after only 14 cycles.

Example 12

Melt spun ribbons of amorphous $Ni_{61}Zr_{39}$ were embrittled with hydrogen (1000psi/150c/17hrs) and crushed in the Spex mill using two 8g and four 1g steel balls. The resulting −200 mesh powder (95% yield) was re-hydrogenated at 1000 psi/150C for 4 hours. Next, the sample was evacuated for 1hr at 150C. Twenty-five grams of this powder was combined with 0.50g of −100 mesh $Al_3Pd$. The mixture was sealed under nitrogen in a steel ball mill jar with one 8g and two 1g steel balls. The mixture was vibratory milled for 0.5 hrs.

This material was first tested for electrochemical hydrogen storage using the procedure of Example 1. It demonstrated a hydrogen storage capacity of 245 mA-hr/g at a discharge rate of 100 mA/g.

Next, approximately 14 grams of this alloyed powder was combined with 6 wgt. % of 2-3μ particle size Ni powder and roll milled onto a 11/14 mil expanded Ni screen to form an electrode. This resultant electrode was 16 mils thick, 1.25" wide and 9.75" long. This electrode, which had 13.87g of active powder at 150 mA-hr/g or 2.08 A-hr, was used as a component in a sealed jelly-roll battery in combination with a G.E. positive electrode with 1.3 A-hr capacity. The sub-C size cell was filled with 6.4N KOH (6.7 ml) and sealed. The initial performance of the positive electrode was 1.22 A-hr at a 5 hr discharge rate. After 70 cycles at a 5 hr rate, the performance had not changed. While the 2 hr initial discharge was slightly lower, the 2 hr discharge capacity after 70 cycles improved by 6%. The charge sequence used was 1.6 times the capacity over a 16 hr period.

Example 13

In this example, crystalline $Ni_{10}Zr_7$ was used as the bulk hydrogen storage alloy and crystalline $Mg_{75}Pd^{15}Pt_{10}$ was used as the noble metal containing compound. Powders of 99 wgt. % $Ni_{10}Zr_7$ and 1 wt. % $Mg_{75}Pd_{15}Pt_{10}$ (less than 250μ particle size) were placed in a steel jar and vibratory ball milled using a Spex 8000 mixer/mill under nitrogen atmosphere, with ten 0.13g steel balls for a milling time of 0.5 hours.

The jar was opened under a nitrogen atmosphere and 3.0 ml of heptane was added and the jar was resealed. The powder and heptane mixture was milled an additional 0.5 hours resulting in a very fine powder, a substantial amount of which was less than 38μ particle size. The material had a stable discharge capacity of 333 mA-hr/g for a 3 hour discharge and an average discharge voltage versus Ni-hydroxide of 1.27 volts.

Example 14

Polycrystalline $ZrCo_{1.2}V_{0.8}$ was mixed with 1 wgt. % $Mg_{93}Pd_7$ and milled for 1 hr using three 1g steel balls in a Spex 8000 mixer/mill as in Example 1 above. the resulting electrochemical hydrogen storage discharge capacity was greater than 320 mA-hr/g for a 2 hour discharge.

The foregoing examples demonstrate the efficiency of compositionally graded amorphous alloy materials in hydrogen storage applications. They further demonstrate the effect that change in the milling variables may have on the resulting alloy and consequently on its hydrogen storage performance.

Example 1 sets forth the basic process of the instant invention. The resulting alloy possessed excellent hydrogen storage capability. Example 2 demonstrates how a change in the milling variables, i.e. less mechanical energy and longer milling time, can still produce a material with excellent capacity as long as a proper relationship is kept among the Example 5, wherein the powder alloy formed was removed and tested for hydrogen storage capability at several intervals, clearly shows a decrease in capacity as a function of milling time. The powder that was milled for 6 hours showed a marked drop in capacity. Increased milling time resulted in a homogeneous distribution of the A component in the alloy and a corresponding drop in the hydrogen storage capacity. This clearly shows the importance of controlling process variables, such as milling time, to achieve a surface gradient structure. This example further shows derivation of the A component from a compound. A comparison of the capacity of the alloy of Example 5 with that of Example 4, in which the A component was derived from pure A metal and not from a compound, shows that capacity was not compromised by use of a compound.

Example 6 illustrates a method of first depositing the A component onto the bulk hydrogen storage material, MM', by an electroless technique, and then milling this material to obtain the desired alloy. As before, there was no loss in capacity.

Examples 8 and 9 display the use of Pd shot in place of steel balls as the milling device. The resulting powder, in both examples, possessed excellent hydrogen storage capacity.

Examples 10 and 11 offer a comparison between two alloy materials, one containing an A component (Ex. 10) and the other devoid of any A component (Ex. 11). the alloy powder containing the A component maintained a voltage above 0.0 volts for 142 cycles when tested. The voltage of the non-A containing powder, however, dropped below 0.0 volts after only 14 cycles.

Example 10 further demonstrates the use of an A-containing compound, in this case an alloy material, wherein the non-A component was chosen such that is could be etched away in the electrolite, i.e. Al in KOH, thus increasing the surface area of the resulting powder, and consequently its absorption and desorption capability.

Example 12 demonstrates use of the inventive alloy material disclosed herein and produced according to the process set forth herein as an electrode in a sealed cell. The electrode in the sealed cell environment displayed capacity and discharge capabilities consistent with the results obtained from the materials tested in the previous examples in open cells.

Examples 13 and 14 illustrate the use of crystalline A-containing materials with crystalline bulk hydrogen storage materials. Example 13 also demonstrates the use of a milling additive, heptane, to achieve smaller particle size.

Examples 1-14 set forth many changes in milling variables, i.e. milling time, ball mill size, powder size, use of milling additives, use of amorphous, crystalline, and polycrystalline starting materials, among others. These examples also demonstrate the need for realizing and achieving the appropriate relationship between variables, such that a compositionally graded amorphous alloy of the formula AMM', as disclosed and claimed herein, possessing the desired capabilities and characteristics, can be produced.

While many variables are exemplified herein, those specific parameters employed in these examples are not intended to be limitative thereof. Rather, the scope of this invention, and the parameters necessary thereto, are intended to include modifications and variations commensurate with the scope of the appended claims.

What we claim is:

1. A process for the synthesis of a compositionally graded substantially amorphous metal alloy of the formula

AMM' wherein M is at least one metal selected from the group consisting of Ni, Co, Fe, Cu, Mn, Pd, Ru, Si, Cr, Mo, W, Al, Sn, Zn, Cd and Ga;

M' is at least one metal selected from the group consisting of Ti, Zr, V, Nb, Ca, Mg, Y, Hf, Ta and the rare earths; and A is at least one metal selected from the group consisting of Pd, Pt, Ir and Rh; said process comprising:

(a) combining an M and M'-containing bulk hydrogen storage material with an A-containing material to obtain a mixture thereof;

(b) sealing said mixture in a mechanical milling device under an inert atmostphere; and (c) milling said mixture.

2. The process as in claim 1 wherein said bulk hydrogen storage material is an amorphous polycrystalline, multi-phase polycrystalline or crystalline material.

3. The process as in claim 1 wherein said A-containing material is a crystalline element, crystalline alloy or amorphous alloy.

4. The process as in claim 1 wherein said mixture is obtained by physically mixing said bulk hydrogen storage material and said A-containing material.

5. The process as in claim 1 wherein said mixture is obtained by electroless deposition of said A-containing material onto said bulk hydrogen storage material.

6. The process as in claim 1 wherein said mixture has a particle size of up to about 250μ.

7. The process as in claim 1 wherein said inert atmosphere is nitrogen, argon, helium or hydrogen.

8. The process as in claim 7 wherein said atmosphere is nitrogen.

9. The process as in claim 1 wherein said milling is accomplished by vibratory ball milling.

10. The process as in claim 9 wherein said milling is carried out for up to about 5 hours.

11. The process as in claim 9 wherein a milling additive is used to decrease particle size of said alloy.

12. The process as in claim 11 wherein said additive is selected from the group consisting of organic solvents, inorganic materials and polymeric materials.

13. The process as in claim 12 wherein said additive is heptane.

14. The process as in claim 1 wherein said milling results in said alloy having at least fifty percent of said A component disposed on or near the surface of said alloy.

15. The process as in claim 1 wherein said milling results in said alloy having at least seventy-five percent of said A component disposed on or near the surface of said alloy.

16. The process as in claim 1 wherein said milling results in said alloy having at least one hundred percent of said A component disposed on or near the surface of said alloy.

* * * * *